United States Patent Office 3,846,108
Patented Nov. 5, 1974

3,846,108
FLOAT GLASS BATH HAVING SUBMERGED
EXTENSION TILES
Randal M. Smith, La Vale, Md., assignor to PPG
Industries, Inc., Pittsburgh, Pa.
Filed Apr. 17, 1973, Ser. No. 351,927
Int. Cl. C03b 18/02
U.S. Cl. 65—182 R         4 Claims

ABSTRACT OF THE DISCLOSURE

A float glass bath is provided with an extension tile for each restrictor. Each extension tile is a hollow body which is partially submerged in the molten tin on which glass is formed. The depth of submergence, as well as the stability of each extension tile, is maintained by providing molten metal inside each extension tile.

BACKGROUND OF THE INVENTION

Field of the Invention

This invention relates to apparatus for manufacturing flat glass by the float method. More particularly, this invention relates to extension tiles in combination with restrictors for confining molten glass on molten metal within the float forming chamber immediately after delivering the molten glass onto the molten metal.

Description of the Prior Art

Flat glass has long been manufactured by delivering molten glass onto a pool or bath of molten metal in an enclosed chamber and cooling and attenuating the glass to form a continuous ribbon of flat glass. When molten glass is delivered onto molten metal, it will naturally seek to assume an equilibrium thickness on the molten metal. The equilibrium thickness for a typical soda-lime-silica glass is about 0.271 inch. In order to make flat glass of other thicknesses, it is necessary to hold the molten glass and prevent it from laterally spreading in order to make thicker glass or to apply stretching forces to it to make thinner glass.

In the making of glass, which is thicker than equilibrium thickness, it has been known to hold the molten glass on the molten metal between non-wettable tiles. According to the teachings of U.S. Pat. No. 3,266,880, non-wettable tiles may be provided on either side of a bath of molten metal to confine a layer of molten glass between them. The glass is cooled while passing between the non-wettable tiles and is withdrawn in ribbon form from the molten metal. Tiles employed to restrict the lateral flow or movement of molten glass are subject to wear and the build-up of devitrified material and other contaminates. Because of this, there have been over the years further improvements in restrictors for use in the manufacture of float glass.

Apparatus for initially restricting and then diverging the flow of glass during manufacture by the float process has been disclosed in U.S. Pat. No. 3,432,285 to Joseph A. Gulotta. That patent teaches the making of glass by delivering molten glass between diverging restrictors. These restrictors extend from a location near the upstream end of a float forming chamber where molten glass is delivered onto the molten metal downstream toward the exit end of the bath. These restrictors are preferably oriented to diverge from the entrance of the bath. Preferably, the restrictors taught in these references are individual elements extending into the float forming chamber, although they may be the side walls of the chamber itself.

In the preferred embodiment described in U.S. Pat. No. 3,432,285, the restrictors are constructed of conventional refractory material which is wettable by molten glass, and, at the downstream tip of each restrictor, there is provided a non-wettable insert which is contacted by the molten glass immediately before the glass passes from between the restrictors. These tips are characterized as extension tile and are preferably made of graphite.

One of the difficulties encountered with the apparatus employed in the making of glass between restrictors has been the problem of maintaining the alignment and position of extension tiles with respect to the moving ribbon of glass. Extension tiles have been held in place by straps, bars or other structural members extending out from the extension tiles to the side of the float forming chamber. Nevertheless, the extension blocks being made of graphite tend to be buoyed up by the molten metal which supports the glass. They frequently become misaligned with respect to the glass and even ride up over the edge of the glass itself. In such instances, the effectiveness of the extension tiles is substantially eliminated.

SUMMARY OF THE INVENTION

There is provided here an apparatus for manufacturing flat glass by the float method comprising, in addition to those elements that are common in conventional float forming chambers, extension tiles mounted on the ends of restrictors which are not subject to being buoyed up and over the edges of a ribbon of glass. The extension tiles employed in the present invention are shaped and weighted such that they maintain their alignment with respect to the restrictors and with respect to the float bath chambers so that a consistent glass facing surface is presented to the molten glass for forming a uniform ribbon of glass of any desired thickness. The present apparatus is particularly useful in making flat glass having a thickness which is greater than equilibrium thickness.

In this invention each extension tile is a hollow body having a bottom and side walls. A portion of the outside face of the side walls is shaped such that it may engage the end of a restrictor. Another portion of the side walls is a glass facing surface which is oriented with respect to a restrictor engaging portion of the body so as to present a continuous surface to the glass. This continuous surface comprises the glass facing portion of the restrictor and the glass facing portion of the extension tile when the extension tile is mounted in its proper place. The extension tile has at least one cavity in it. The cavity is provided to contain a ballast so that the effective density of the extension tile is such that it will be partially submerged in the molten metal on which the glass floats. Preferably, sufficient ballast will be provided to submerge the extension tile to one-third to two-thirds its depth.

An extension tile may be relatively short as measured along its glass facing surface in which instance it may comprise a single cavity. However, in the making of thick glass of the order of at least three-quarters inch thickness, it is desirable to have a relatively long extension tile of the order of at least about 18 to 24 inches. When a relatively long extension tile is employed, it is desirable that the extension tile have a plurality of cavities for receiving ballast with the cavities disposed from one another along the length of the extension tile measured from its upstream end to its downstream end. By providing a long extension tile with a plurality of ballast cavities, it is possible to carefully balance the submergence of the extension tile along its length and to stabilize it so that the glass passing along its glass facing surface is presented with a substantially unchanging contact along the entire length of the extension tile at all times.

The ballast employed may be any material having a density as great or greater than the density of the molten metal supporting the extension tile and glass being formed. For example, the ballast may be a molten salt, may be lead, tin or any other metal which is not subject to reaction in the atmosphere or environment of the float forming chamber. Preferably, the ballast employed is molten tin or tin alloy identical to the molten tin employed as the bath for supporting the glass. By using the identical molten metal as a ballast, any risk of contaminating the chamber through accidental spillage during the insertion or withdrawal of an extension tile is eliminated.

The extension tile is retained in place against a restrictor and is prevented from being dragged downstream with the glass by mounting it on a strap or other retaining means which is connected to a fixed support. This support may be mounted on the wall of the chamber or may be mounted outside of the chamber with the strap connected to the extension tile extending through a sealed opening in the chamber wall.

In a preferred embodiment for the making of thick glass having a thickness greater than one-half inch and more preferably for making glass having a thickness greater than three-quarters inch, it is desirable to provide means for cooling the extension tile in order to control the thermal condition of the edges of the ribbon of glass in contact with the extension tile. This is the subject matter of a copending application of Robert B. Heithoff entitled "Apparatus and Method for the Manufacture of Float Glass Having a Thickness Greater Than Equilibrium Thickness," Ser. No. 351,946 which was filed on Apr. 17, 1973, and is commonly assigned. That related copending application is expressly incorporated by reference herein.

This invention will be more fully understood from a description of the drawings accompanying this disclosure.

DESCRIPTION OF THE PREFERRED EMBODIMENT

Figure 1:
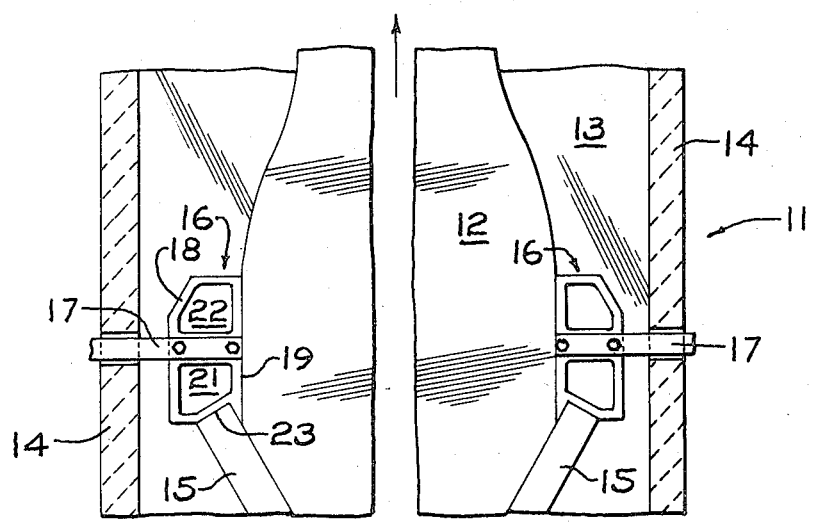
FIG. 1 is a schematic plan view of a portion of a float forming chamber according to this invention having therein extension tiles according to the preferred embodiment of this invention.
Figure 3:
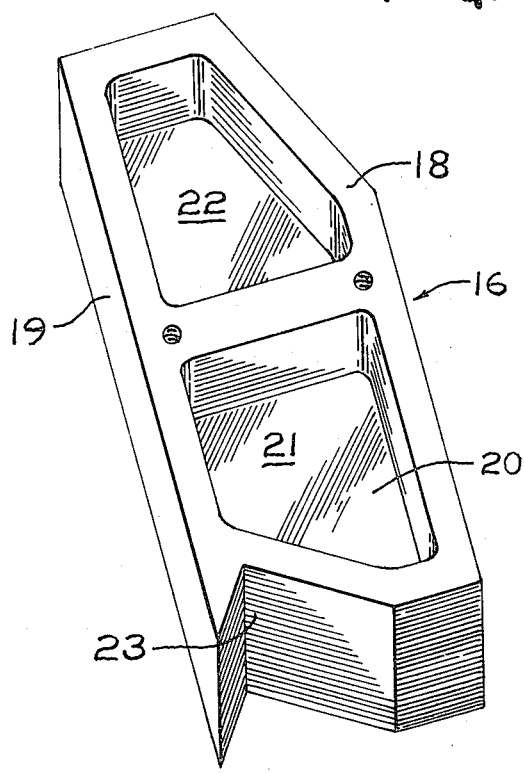

Referring now particularly to FIGS. 1 and 3, there is seen the apparatus comprising a preferred embodiment of this invention. A float chamber 11 is provided for receiving glass 12 in a molten state from a glass melting furnace (not shown). Within the float chamber 11 is a pool or bath of molten metal 13, preferably tin or a tin alloy. Molten glass 12 is delivered onto the molten metal 13 on which it floats while being cooled and attenuated to form a dimensionally stable continuous ribbon of flat glass.

The float chamber 11 comprises side walls 14 and restrictors 15 which extend downstream from the feed end of the float forming chamber 11. The restrictors 15 may be substantially parallel but are preferably diverging restrictors as shown in FIG 1.

At the end of each restrictor 15 there is an extension tile 16. The extension tile 16 is held in place by retaining means 17, which, in the preferred embodiment, is simply a strap to which the extension tile 16 is connected. The retaining means or strap 17 is mounted on a fixed mounting (not shown) outside the float forming chamber 11. The strap or retaining means 17 therefore passes through a wall 14 of the chamber 11. The opening through which the retaining means passes is, of course, sealed to prevent the loss of a protective reducing atmosphere which is maintained within the float forming chamber 11. Considering the environment of the float forming chamber, the retaining strap 17 is preferably made of stainless steel.

The extension tile 16 comprises substantially vertically oriented walls 18, one of which provides a glass-facing surface 19. The extension tile 16 also has a bottom 20 so that the structure is a hollow body like a boat having cavities 21 and 22 therein. A portion of the wall 18 of the tile has a notch 23 or otherwise shaped portion for engaging the end of a restrictor 15.

During operation molten glass is delivered onto the surface of molten metal between the restrictors 15. The molten glass flows downstream in the direction indicated by the arrow in FIG. 1. During its flow or movement downstream the glass is cooled to form a ribbon of glass. At the downstream end of the float forming chamber the ribbon of glass is removed from the molten metal by lift-out rolls or other removal means (not shown). In the space above the molten metal and glass there is provided an inert atmosphere to prevent the oxidation of the molten metal.

As the glass passes along between the restrictors, it is held in and prevented from spreading laterally under the influence of its own thickness and gravity. By the time the glass has passed from between the extension tiles, it may be cooled sufficiently so that it would spread laterally only slowly, if at all, due to its relatively high viscosity. Tractive forces may be applied to the glass both longitudinally and laterally downstream of the extension tile to attenuate or stretch the glass to a thickness substantially less than equilibrium thickness. Alternatively, the glass may be cooled while not subjected to so much tractive force so that glass may be produced having a thickness exceeding equilibrium thickness. In the absence of substantial longitudinal tractive forces which are along the direction of general glass movement shown by the arrow in FIG. 1, the width of the glass would not decrease downstream of the extension tiles but could rather be allowed to spread outwardly toward the walls 14 and even come into contact with these walls in order to form glass having a thickness substantially greater than equilibrium thickness.

Figure 2:
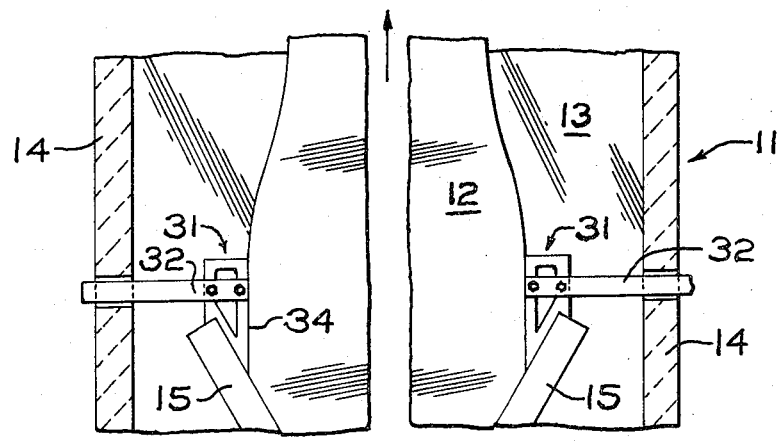
FIG. 2, like FIG. 1, is a schematic plan view of a portion of a float forming chamber according to this invention showing another embodiment of the extension tile according to this invention.
Figure 4:
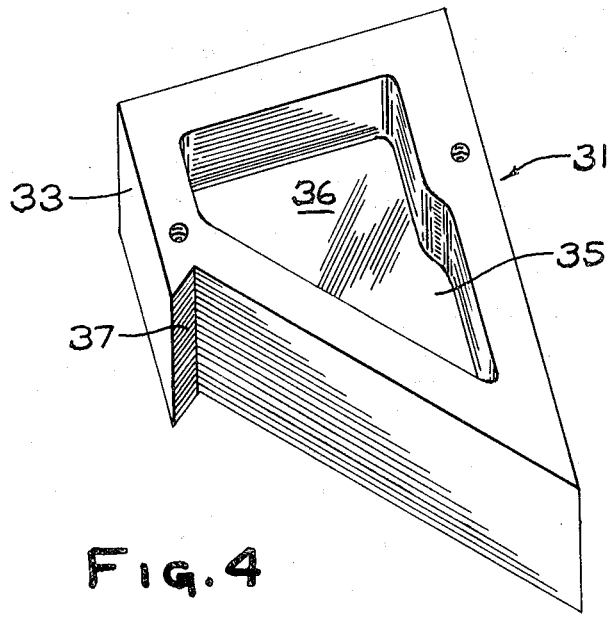
FIGS. 3 and 4 are detailed perspective views of extension tiles employed in this invention corresponding to the extension tiles shown in FIGS. 1 and 2, respectively.

Referring now to FIGS. 2 and 4, there is seen another embodiment of the present invention. In this embodiment of the invention there is shown a second type of extension tile 31 having a single cavity. This extension tile 31 is held in place by support arm 32 in the same manner that the tile of the preferred embodiment is held in place. The tile 31 shown in FIGS. 2 and 4 comprises substantially vertical side walls 33, one having a glass facing surface. It further comprises a bottom 35, with the bottom 35 and the side walls 33 forming a single cavity 36. A portion of the side walls has a notch 37 for engaging a restrictor 15. The cavity of this extension tile 31 is filled with ballast, preferably molten tin or tin alloy, just as in the preferred embodiment.

The extension tiles employed in the practice of this invention may be made of any material which may be used in contact with molten glass without substantially contaminating it. While the preferred material is graphite or some other material which is non-wettable or substantially non-wettable by glass at its use temperature, it is possible to employ a material such as a $\beta$-alumina material or some other refractory material which is wet to some extent by glass. Wettable materials are particularly useful when making glass which is thinner than equilibrium thickness glass.

Those skilled in the art of flat glass manufactured by the float method will realize that the present description, which is limited to specific embodiments of this invention, is not exhaustive. It will be evident that the principles of this invention may be used to advantage while employing obvious equivalents of the specific materials described here for purposes of illustration.

What is claimed is:

1. In an apparatus for manufactlring flat glass by the float method comprising an enclosed chamber defined by a bottom, roof and walls, said chamber having a bottom portion containing a bath of molten metal and an upper portion for enclosing an inert atmosphere over said molten metal; having an upstream end for receiving molten glass onto said molten metal; having a downstream end containing means for removing a continuous ribbon of glass from said molten metal and having means therein for cooling and attenuating said molten glass to form said ribbon of glass while floating on said molten metal; wherein at its upstream end there is disposed a pair of restrictors in spaced relation, each extending downstream from the upstream end of said chamber, said pair, in combination, providing space for receiving said molten glass between them and for confining it between them on said molten metal while cooling it and drawing it along the surface of said molten metal; the improvement comprising, at the end of each restrictor, an extension tile comprising:

(a) a hollow body comprising a material which is buoyant in said molten metal and having a bottom and side walls; a portion of said side walls having a restrictor engaging shape and a portion of said side walls having a glass facing surface, said bottom and side walls forming at least one cavity, and said side walls terminating at the top of said extension tile so as to provide an opening for access to each said cavity for the introduction and removal of a ballast material so as to provide sufficient ballast to partially submerge said body in said molten metal, and (b) a retaining means for holding said hollow body in engaging relationship to said restrictor with its glass facing surface in at least partial facing relationship to that of the other hollow body of said pair.

2. The apparatus according to Claim 1 wherein said hollow body comprises graphite and said ballast is molten tin.

3. The apparatus according to Claim 1 wherein said retaining means comprises a support arm connected to said hollow body and said arm extends outwardly through a wall of said enclosed chamber and is connected to a fixed mounting.

4. The apparatus according to Claim 1 wherein said body is elongated and comprises a plurality of cavities disposed along its length.

References Cited

UNITED STATES PATENTS

| | | | |
|---|---|---|---|
| 3,395,996 | 8/1968 | Loukes | 65—65 A |
| 3,468,653 | 9/1969 | Robinson et al. | 65—182 R |
| 3,582,302 | 6/1971 | Kita et al. | 65—182 R |

ARTHUR D. KELLOGG, Primary Examiner

U.S. Cl. X.R.

65—65 A, 99 A